Feb. 20, 1923.
T. ZIMMERMAN.
AXLE.
FILED MAY 8, 1919.
1,446,240.
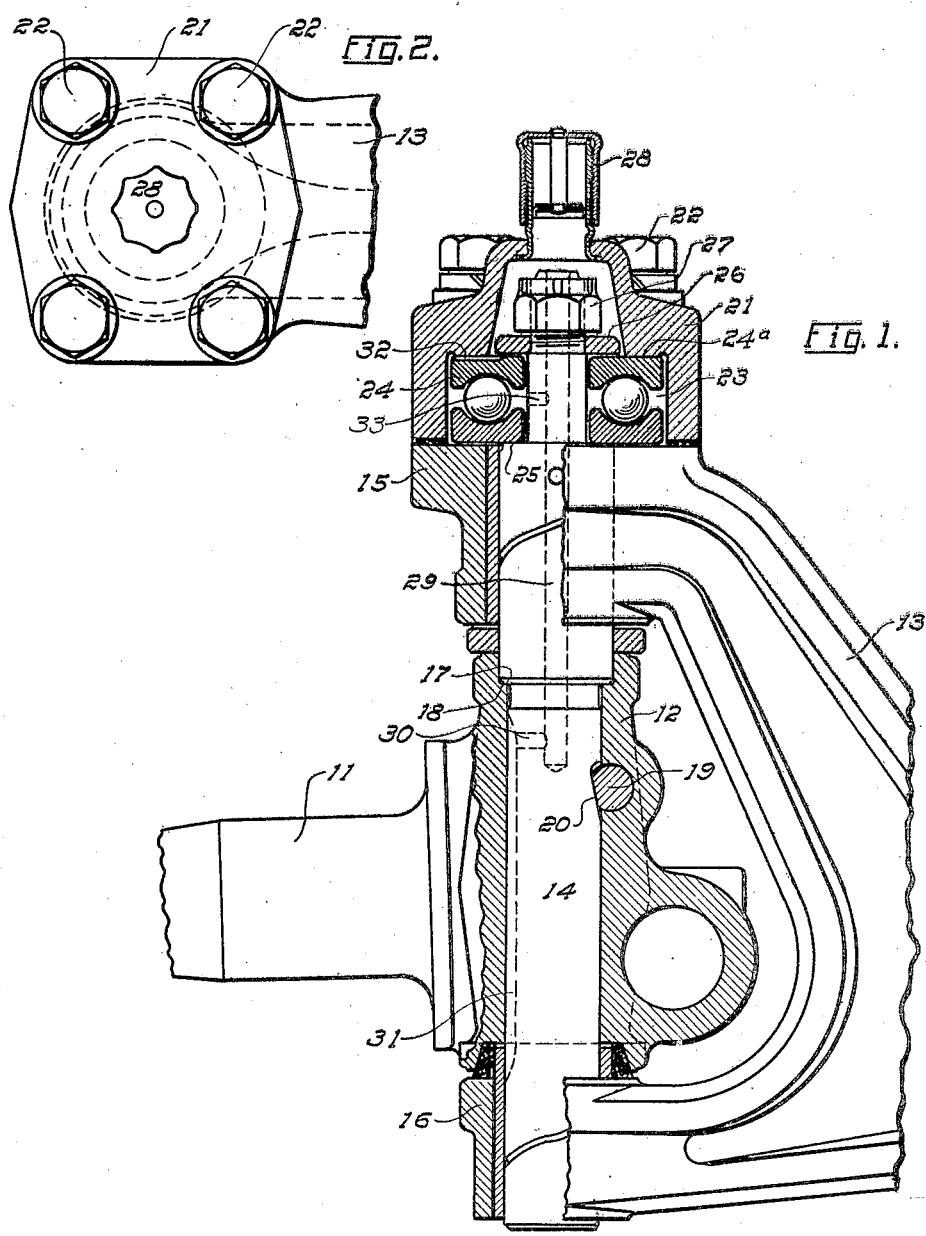
Inventor
Thomas Zimmerman
By
[signature]
Attorney Patented Feb. 20, 1923.

1,446,240

UNITED STATES PATENT OFFICE.

THOMAS ZIMMERMAN, OF CLEVELAND, OHIO, ASSIGNOR TO THE STANDARD PARTS COMPANY, OF CLEVELAND, OHIO, A CORPORATION OF OHIO.

AXLE.

Application filed May 8, 1919. Serial No. 295,669.

*To all whom it may concern:*

Be it known that I, THOMAS ZIMMERMAN, a citizen of the United States, and a resident of Cleveland, county of Cuyahoga, State of Ohio, have invented certain new and useful Improvements in Axles, of which the following is a specification.

This invention relates to means for pivotally mounting a steering spindle upon a motor vehicle axle so that the wheel mounted on such spindle can be directed for steering the vehicle.

One object of the invention is to provide a roller bearing connection between the yoke of a steering axle and a steering knuckle, in which a steering knuckle of maximum length may be used without widening the yoke. Another object is to provide such a construction in which a relatively large bearing surface, between the pivot pin and the yoke, is obtained. A still further object is to provide such a construction in which the roller bearing is so positioned as to be readily accessible for inspection and replacement and so supported that it may be easily kept supplied with sufficient lubricant.

Other objects and the features of novelty of the invention will be apparent from the following description, taken in connection with the accompanying drawings, of which:—

Figure 1 is a fragmentary vertical section through the end of a steering axle embodying the invention; and Figure 2 is a fragmentary plan view of the end of the axle and the cap thereon.

In the drawings, 11 indicates a steering spindle for a motor vehicle wheel which is formed integral with the steering knuckle 12 which is mounted on the axle 13 by means of a pivot pin 14. The axle 13 terminates in a yoke comprised of an upper arm 15 and a lower arm 16 and the pivot pin 14 extends in a substantially vertical direction through the arms 15 and 16 and the steering knuckle 12. The pivot pin 14 is provided with a shoulder 17 which is adapted to cooperate with the shoulder 18 formed in the upper portion of the steering knuckle 12 and a draw pin 19 extends transversely through the steering knuckle and engages the inclined surface 20 on the pivot pin 14 to hold the shoulders 17 and 18 firmly together.

A bearing cap 21 is mounted upon the top of the arm 15, by bolts 22, and has a bearing recess 23 therein in which the thrust bearing 24 is seated, and the pivot pin 14 is reduced at its upper end so as to provide a shoulder 25 which cooperates with the lower race member of the thrust bearing, a washer 26 and a nut 27 being provided on the end of the shaft to hold the parts of the bearing in assembled relation. The upper race member of the thrust bearing 24 bears against the surface 24$^a$ in the cap 21, so that the load on the axle is carried through the arm 15, the bolts 22, cap 21, thrust bearing 24 and pivot pin 14 to the spindle 11. When a reversal of the thrust in the pivot pin 14 occurs, as, for instance, when the unevenness of the road causes the axle to lift, and the wheel is supported by the axle, the load of the wheel is carried by the spindle 11, knuckle 12, pivot pin 14, nut 27, washer 26, and roller bearing 24 to the upper face of the upper arm 15 of the yoke 13. It will be understood that the washer 26 is positioned close to the surface of the upper race member of the roller bearing, so as to reduce to a minimum the motion between the knuckle and the yoke, but normally out of contact with the race member so that the latter is free to rotate. By placing the bearing 24 above the arm 15, instead of between the latter and the knuckle 12, as is the usual practice, it is possible to use a ball thrust bearing and have relatively large bearing surfaces for the pivot pin 14 in the arms 15 and 16, and at the same time a relatively long knuckle without having an unduly deep yoke on the axle, which would not only increase the difficulties in forging the axle but would also require the yoke to be of heavier design and more expensive to manufacture.

In the top of the cap 21, a grease cup 28 is provided, and the pivot pin 14 has an axial opening 29 therein to permit the passage of the lubricant to the various bearing surfaces and is connected at 30 to a groove 31 through which the lubricant may pass to the bearing surfaces in the lower arm 16. The upper race member of the bearing 24 has a plurality of radial grooves 32 in its upper surface through which the lubricant may pass around the race member to the rollers of the bearing 24, and an axial opening 33 leading from the axial opening 29 permits the lubricant to pass to the interior of the ball race between the race members.

Having thus described my invention, what I claim is:

1. The combination of an axle, a wheel spindle pivotally connected thereto, one of said members having a yoke thereon, and the other member having a knuckle between the arms of the yoke, a pin mounted in said knuckle and yoke, and a bearing carried by one of the arms of said yoke, said pin being reduced to form an annular shoulder thereon cooperating with said bearing, to transmit axial thrust thereto.

2. The combination of an axle, comprising a yoke, a steering knuckle between the arms of said yoke, a pivot pin mounted in said knuckle and said arms, a bearing support removably secured to the upper arm of said yoke on the upper side thereof, and a bearing seated in said support and cooperating with a shoulder on said pin to support the vertical load of the axle on the pivot pin.

3. The combination of an axle, comprising a yoke, a steering knuckle between the arms of said yoke, a pivot pin mounted in said knuckle and said arms, a bearing support removably mounted on said axle and having a recess therein, and a bearing mounted in said recess and surrounding said pivot pin to transmit axial thrust, said pivot pin having an opening therein through which lubricant may pass to the ball race of said bearing.

4. In a device of the class described, the combination of an axle and a wheel spindle, one of said parts having a yoke thereon and the other having a knuckle between the arms of the yoke, a pin mounted in said knuckle and the arms of said yoke and having a lateral support throughout the vertical extent of such arms, a cap wholly on the outer side of one arm of said yoke and removably secured thereto, said cap having a recess therein, and a bearing seated in said recess and cooperating with a shoulder on said pin to receive the axial thrust therefrom.

5. In a device of the class described, the combination of an axle, a wheel spindle pivotally connected thereto, one of said members having a yoke thereon and the other having a knuckle between the arms of the yoke, a pin mounted in said knuckle and yoke, said knuckle and pin being formed with cooperating shoulders, and an annular thrust bearing carried by one arm of said yoke and wholly on the outer side thereof cooperating with said pin to transmit the end thrust from said pin to said yoke.

6. In a device of the class described, the combination of an axle, a wheel spindle pivotally connected thereto, one of said members having a yoke thereon and the other having a knuckle between the arms of the yoke, a pin mounted in said knuckle and held from movement therein, said pin having portions thereof journaled in the arms of said yoke and supported laterally throughout their extent through said arms, a cap on the outer side of one arm of said yoke, a bearing cooperating with said cap and said pin to receive axial thrusts, and threaded members for removably securing said cap to said yoke.

7. In a device of the class described, the combination of an axle and a wheel spindle, one of said parts having a yoke thereon and the other having a knuckle between the arms of the yoke, said yoke having alined openings in the arms thereof, a pin mounted in said knuckle and held from movement therein, said pin having portions thereof journaled in the openings in the arms of the yoke, a cap removably secured to one arm of said yoke and closing the outer side of the opening therein, and an annular bearing cooperating with shoulders on said cap and said pin whereby the vertical load of the axle is supported on said spindle.

8. In a device of the class described, the combination of an axle and a wheel spindle, one of said parts having a yoke thereon and the other having a knuckle between the arms of the yoke, a pin mounted in said knuckle and yoke, said pin being reduced to form an annular shoulder thereon, a cap removably secured on the outer side of one arm of said yoke, a bearing surrounding the reduced portion of the pin and cooperating with said cap and the shoulder on the pin to transmit axial thrust, and means on said pin for retaining said bearing in position when said cap is removed.

In testimony whereof I affix my signature.

THOMAS ZIMMERMAN.